Sept. 30, 1924.   1,510,410
W. C. MENYHART ET AL
CAMERA
Filed Oct. 24, 1923
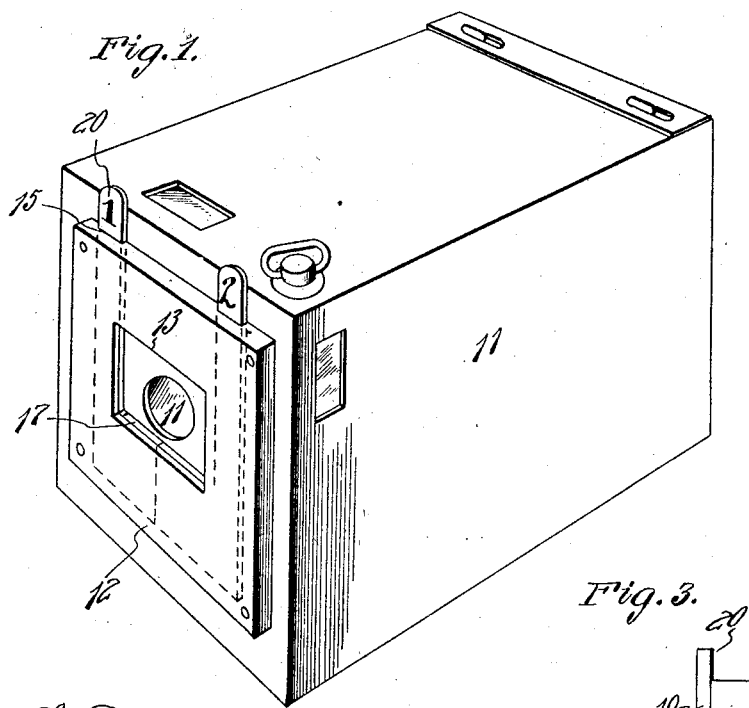
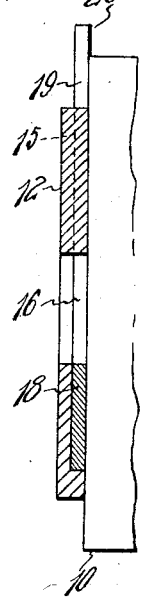
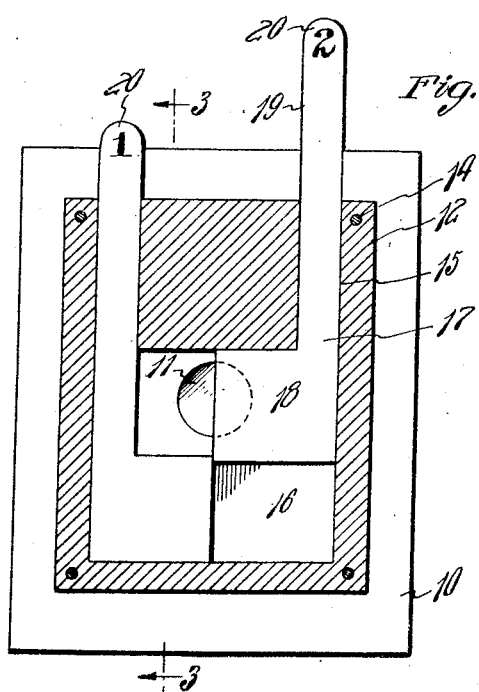
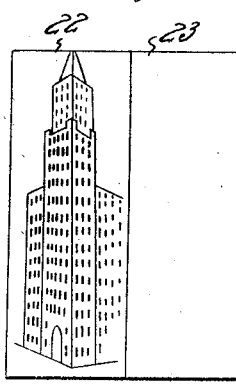
W.C. Menyhart
B. Katz
INVENTOR
BY Victor J. Evans
ATTORNEY
WITNESS:

Patented Sept. 30, 1924.

1,510,410

UNITED STATES PATENT OFFICE.

WALTER C. MENYHART AND BENJAMIN KATZ, OF NEW YORK, N. Y.

CAMERA.

Application filed October 24, 1923. Serial No. 670,550.

*To all whom it may concern:*

Be it known that we, WALTER C. MENYHART and BENJAMIN KATZ, citizens of the United States of America, residing at New York city, in the county of New York and State of New York, have invented new and useful Improvements in Cameras, of which the following is a specification.

This invention relates to cameras and more particularly to the type of camera known as the box camera.

The principal object of the invention is to provide a camera wherein one-half of the sensitized film may be exposed at a time so as to permit the taking of two pictures in the space now required in the taking of a single picture.

Another object of the invention is to provide a shutter attachment which may be applied to box cameras without changing the arrangement of parts thereby permitting the same to be added or applied to the present box cameras now in use.

A further object of the invention is to provide a camera which will greatly reduce the cost of photography by facilitating the taking of twice the number of pictures on a standard roll film as are taken by the use of the present make of camera.

A still further object of the invention is to provide an attachment for a camera which is simple in construction, cheap of manufacture and easy of operation.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a perspective view of a box camera with our invention applied thereto.

Figure 2 is a transverse sectional view of the same.

Figure 3 is a vertical sectional view on the line 3—3 of Figure 2.

Figure 4 is a detail view of a single sensitized film showing one-half of the same as having been exposed.

Like characters of reference refer to like parts throughout the several views of the drawing.

Referring more particularly to the drawing, the reference numeral 10 designates a camera of the box construction, provided in its front wall with a lens opening 11. It is to this type of camera that our invention is primarly adapted for use but we wish it to be understood that the same may be applied to a folding camera with equally good results if desired, providing certain alterations in construction are made.

Our invention comprises a housing or plate 12 which may be constructed of any suitable light material, and is provided centrally thereof with a rectangular opening 13. The housing 12 may be attached to the front of the camera 10 in any suitable well-known manner, but in the present instance the same is shown attached by means of fastening elements 14. The housing is attached so that the opening 13 exposes the lens opening 11 of the camera. The housing is further provided with a pair of vertical slots 15, which communicate with a cut-away portion 16, which portion co-acts with the front wall of the camera to form a pocket for a pair of shutters 17. The shutters 17 are identical in construction and are L-shaped to provide a relatively broad portion 18 which serves as a blind, and an extension 19. The extensions 19 of the shutters extend through the slots 15 to a point slightly above the top of the camera so as to provide manipulating portions 20 for a purpose of moving the portions 18 to a position to cover or uncover one-half of the lens opening 11. It will be noted that the portions 18 extend inwardly to a point in vertical alignment with the axis of the lens opening whereby one shutter is capable of closing one-half of the opening for exposing one-half of a sensitized film strip. In moving the shutter to its position to uncover the opening 11 an upward pull is given the extension 19 and the same is limited in its movement by the top wall of the opening 13. To uncover the opening, shutters 17 are pushed downward and the same are limited in their downward movement by the bottom wall of the cut-away portion 16. If desired the manipulating portions 20 may be provided with numbers whereby it is possible to identify the two shutters so as to prevent confusion.

In Figure 4 there is shown a positive print 21 made from a negative taken on one half of the plate and produces a picture 22 and the other half of which is blank as at 23. It will be seen that when both shutters are alternately moved to cover and uncover the lens opening 11, both halfs of the film may be exposed so that two pictures may be taken side by side. By this arrangement certain exposures might be taken as to produce what is known as "trick photography" which has been found to be interesting as well as amusing.

It is to be understood that the shutters 18 do not interfere with the taking of a whole film if desired as both the shutters may be moved to uncover the lens opening.

While we have described what we deem to be the most desirable embodiment of our invention, it is obvious that many of the details may be varied without in any way departing from the spirit of our invention, and we therefore do not limit ourselves to the exact details of construction herein set forth nor to anything less than the whole of our invention limited only by the appended claims.

What is claimed as new is:—

1. In a device of the class described, the combination with a box camera, having a lens opening, a housing secured to the front of the camera and provided with an opening for register with the lens opening, pockets formed in said housing, slots communicating with said pockets and opening at one side of said housing, shutters mounted for sliding movement in said housing and normally concealed within said pockets, manipulating portions formed on said shutters, and extending out of said slots for guiding the shutters when moved alternately across said lens opening.

2. In a device of the class described, the combination with a box camera having a lens opening, a housing mounted on the front of the camera and provided with an opening for register with the lens opening, L shaped shutters mounted for sliding movement in said housing, manipulating portions formed on said shutters, and extending out of said housing for permitting the same to be moved alternately across said lens opening, and means for limiting the movement of said shutters in either direction.

In testimony whereof we have affixed our signatures.

WALTER C. MENYHART.
BENJAMIN KATZ.